United States Patent Office 3,823,086
Patented July 9, 1974

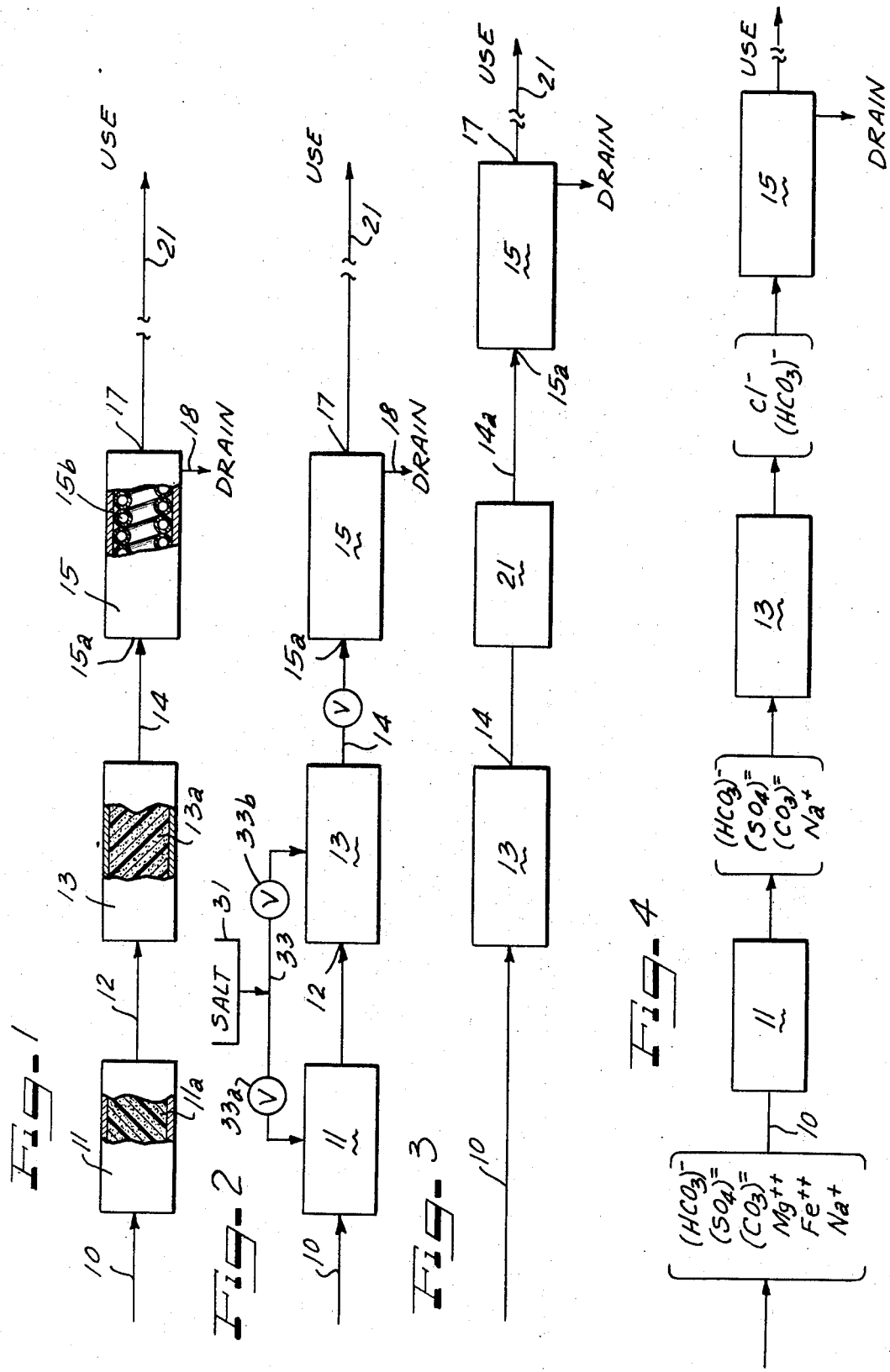

3,823,086
PRETREATMENT FOR REVERSE OSMOSIS PROCESS
Kenneth A. Schmidt, Clarendon Hills, Ill., assignor to Culligan International Company, Northbrook, Ill.
Filed Jan. 22, 1973, Ser. No. 325,570
Int. Cl. B01d 13/00, 31/00
U.S. Cl. 210—23  6 Claims

ABSTRACT OF THE DISCLOSURE

A pretreatment process for increasing the useful life of a reverse osmosis membrane comprising passing at least a portion of a reverse osmosis module influent through a strong basic type II anion exchange resin until carbonate ions are detected in the exchange resin effluent. A reverse osmosis module influent is thus controlled to continuously have a pH value below 8, which greatly increases the life of a cellulose acetate reverse osmosis membrane. The capacity of the anion exchange resin is extended beyond the conventional end point for such resin.

BACKGROUND OF THE INVENTION

Field of the Invention

The invention relates to water treatment and more particularly to a process of controlling the pH of influent water of a reverse osmosis module.

Prior Art

Dialkylization of water with highly basic anion exchange resins is known. Presently preferred highly basic anion exchange resins are chloride-ion exchange resins which remove anions such as sulfate, nitrate, carbonates and bicarbonate ions from water in exchange for chloride ions. Alkalinity of water for industrial and/or domestic purposes is generally defined in terms of bicarbonate alkalinity and in terms of carbonate alkalinity. Water containing both types of alkalinity ions will have a pH value above 8. In conventional dealkalization processes, such as boiler feed water pretreatment process or cooling water make-up pretreatment process, the leakage or detection of bicarbonate ions in the resin effluent marks the capacity or end point of the resin, i.e. a highly basic anion exchange resin, to usefully dealkalize water and requires that such resin be regenerated.

Preferably, water influent to a highly basic ion exchange resin is first softened by passing such water through a conventional sodium zeolite softener. This is not absolutely necessary, but a precautionary measure since unsoftened water may precipitate calcium and magnesium in the dealkalizer bed.

The alkalinity of water is unchanged in passing through a sodium zeolite softener and generally only calcium and magnesium ions are removed. A highly basic anion exchange resin exchanges its anion, such as a chloride ion, for other anions in the water, including alkaline ions in water, such as $(OH)^-$, then $(CO_3)^=$, $(SO_4)^=$ and then $(HCO_3)^-$. A highly basic anion exchange resin exposed to various alkalinity ions tends to react with all such ions and to release monovalent alkaline ions such as $OH^-$ and $HCO_3^-$ before divalent $CO_3^=$ ion. The first alkalinity ion detected in a highly basic anion exchange resin effluent will be the bicarbonate ions. Accordingly, highly basic anion exchange resins have a farily low loading factor or capacity for bicarbonate ions. A typical loading factor for bicarbonate ions and other anions selectively held by the resin such as sulfates and nitrates in a chloride-ion exchange resin with softened water is in the order of about 6 to 12 kilograins of exchangeable anions, calculated as calcium carbonate equivalents per cubic foot of resin. However, chloride-ion exchange resin effluent containing only bicarbonate ions therein, i.e. at the conventional end point or capacity of such a resin, has a pH value below about 8 to 8.2. Nevertheless, water containing only bicarbonate ions is considered detrimental for such uses as boiler water-feed, cooling water make-up, etc. and the pH value of such water does not outweigh the detrimental alkalinity factors in these applications.

Reverse osmosis systems for purifying water for specialized domestic and/or industrial uses, such as laboratory or hospital uses, are known. Generally, a reverse osmosis membrane is composed of cellulose acetate and is enclosed in a cartridge or module in such a manner that impure water entering the module is exposed to the reverse osmosis membrane and, since the pressure on the impure water is maintained above the osmic pressure for the membrane, the solvent phase of the water solution flows through the membrane at a higher rate than the solute or impure phase; thus providing a quantity of purified water. Impure water which does not pass through the reverse osmosis membrane becomes more concentrated in impurities and is passed to a drain.

In such reverse osmosis module, the cellulose acetate membrane life is effected by the quality of influent water. If the pH value of the influent is too high, the useful life of the membrane is greatly reduced, and tends to destroy the economic operation of a reverse osmosis module. Also, a high degree of hardness (mineral content) in the influent water may cause precipitation or scaling on the membrane, which tends to reduce the efficiency thereof. A known method of controlling the degree of hardness in water is a conventional softening process wherein water is passed through a strongly acidic cation exchange resin. A known method of controlling the pH of water influent to a reverse osmosis membrane is to feed acids to the influent prior to the reverse osmosis module. However, in many environments, such as in hospitals or homes, the use of acids is objectionable and/or undesirable.

SUMMARY OF THE INVENTION

The invention provides a method of pretreating influent water of a reverse osmosis module so as to maintain the influent pH below about 8.

It is a novel feature of the invention to pass influent water of a reverse osmosis module through a strong basic, type II, anion exchange resin until carbonate ion leakage is detected in the resin effluent.

BRIEF DESCRIPTION OF THE DRAWINGS

FIG. 1 is a schematic illustration of a water treatment process which incorporates the principles of the invention;

FIG. 2 is a schematic showing of a modification of the water treatment system illustrated at FIG. 1;

FIG. 3 is a schematic illustration of another embodiment of a water treatment system which incorporates the principles of the invention; and FIG. 4 is an illustration somewhat similar to FIG. 1 and shows various ions present at various stages of the pretreatment process.

DESCRIPTION OF THE PREFERRED EMBODIMENTS

The invention provides a process of pretreating reverse osmosis influent to constantly maintain the pH value thereof below about 8 without the use of acid and a reverse osmosis apparatus comprising, in one embodiment, a combination of a pretreatment unit containing a conventional water softener unit and an anion exchange unit containing a strong basic, type II, anion exchange resin (chloride ion exchange resin) in direct communication with a reverse osmosis module.

Reverse osmosis modules are known, for example, see U.S. Pat. No. 3,456,803 to S. F. Rak. In such reverse osmosis modules, the semi-permeable membranes are conventionally composed of cellulose acetate. Extensive studies have shown that reverse osmosis membrane life, i.e. the period of time during which a membrane rejects salt and purifies water passing through it, is highly dependent upon the pH of the module influent. For example, a reverse osmosis membrane subjected to an influent having a pH of 12 shows a very rapid degradation and may be considered useless within about a week. Similarly, an influent having a pH of 9 or 10 allows the membrane to remain functional for only about 90 days. In contrast, an influent having a pH below 8 and preferably in the range of about 7 to 8 allows the membrane to remain functional well beyond 300 days.

Conventional dealkalization by chloride-ion exchange terminates at very early leakage of bicarbonate ions (i.e. at about 10% bicarbonate ion leakage) in the resin effluent. Water having carbonate and bicarbonate ions therein will have a pH value of above 8 and water having only bicarbonate alkalinity therein will have a pH value below about 8. Contrary to conventional dealkalization of water with a strong basic, type II, anion exchange resin, such as a quaternary ammonium resin in the chloride form, the principles of the invention allow continued treatment of water despite the presence of bicarbonate ions in the resin effluent since the pH thereof is still below 8. The invention continues to usefully treat reverse osmosis influent water until carbonate ion leakage is detected in the effluent thereof, i.e. until the effluent pH is above 8, thereby achieving a surprisingly greater strong basic type II anion exchange resin dealkalization capacity. Of course, once carbonate ions are detected in the resin effluent, the strong basic type II anion exchange resin within the treatment system of the invention is regenerated.

The invention comprises adjusting the pH value of water influent to reverse osmosis module by passing such water through a strong basic type II anion exchange resin bed until carbonate ions are detected in the resin bed effluent so that the reverse osmosis influent continuously has a pH of below 8 and generally in the range of 7 to 8.

Various strong basis type II anion exchange resins are known, for example, such as available under the name "Dowex" (a registered trademark) SAR; "Duolite" (a registered trademark) 102D; "Amberlite" (a registered trademark) IRA 410; and similar anion exchange resins. A preferred strong basic type II anion exchange resin is a quaternary ammonium resin in the chloride form.

Strongly basic type I anion exchange resins, such as available under the name "Amberlite" (a registered trademark) IRA–400 or IRA–402; "Dowex" (a registered trademark) SBR or SBR-P; "Doulite" (a registered trademark) 101–D; and similar anion exchange resins also function in accordance with the teachings of the invention. Type I anion exchange resins are somewhat more chemically and thermally stable than type II, but they do not possess the capacity of type II and accordingly it is preferable to utilize strong basic type II anion exchange resins but type I may be used if desired.

The capacity of strongly basic anion exchange resins (chloride-ion exchange resins) for the less alkaline ions is markedly less than for the strongly alkaline carbonate ions so that bicarbonate ion leakage in the resin effluent is detected well prior to any carbonate ion leakage. However, since bicarbonate ions effect the alkalinity of treated water, conventional dealkalization processes utilizing anion exchange resins are said to be exhausted shortly after bicarbonate ions are detected in the effluent thereof. Bicarbonate ions may exist at pH values below about 8 and thus a reverse osmosis influent having bicarbonate ions therein may provide an environment for extended membrane life. Accordingly, water treatment systems that regenerate an anion exchange resin (strongly basic chloride-ion exchange resin) as soon as alkalinity (i.e. bicarbonate ions) is detected in the effluent thereof, are unable to achieve full resin capacity for lowering the pH value of water, as required for economic reverse osmosis process.

The drawings illustrate certain exemplary embodiments of treatment processes utilizing the principles of the invention and like elements have identical reference numerals.

Referring to the embodiment at FIG. 1, a raw water influent line 10 communicates with a conventional water softening unit 11, which is substantially filled with a sodium zeolite or another strongly acidic cation exchange resin, such as is available, for example, under the trade name "Amberlite" (a registered trademark) IR–120 or 200. The unit 11 has an effluent conduit 12 communicating with a dealkalizing unit 13, which is substantially filled with a strongly basic type II anion exchange resin 13a. The unit 13 has a pretreatment effluent conduit 14 communicating with a reverse osmosis module 15. The reverse osmosis module may be similar to that disclosed by S. F. Rak in U.S. Pat. No. 3,456,803 (which is incorporated herein by reference) and includes an influent inlet 15a, a spirally wound semi-permeable membrane 15b within the module, a purified water outlet 17 and an impure water outlet 18 communicating with a suitable drain.

A conduit 21 communicates with purified water outlet 17 and in the embodiment shown, communicates directly with an intended use. Control valves may be provided within the various conduits to regulate the flow of water as desired.

The modified system illustrated at FIG. 2 is essentially identical with the embodiment of FIG. 1, except that it includes a regeneration system, which may be incorporated with the reverse osmosis pretreatment system of the invention. As shown, a salt or brine tank 31 is positioned in working relation with the units 11 and 13 and a conduit 33 provides a passage to both units. Valve means 33a and 33b provide control of the salt flow during regeneration. A preferred regeneration cycle comprises a 5-step cycle wherein spent resin beds are first backwashed, then rinsed with a brine solution, then slow rinsed with water, then fast rinsed with water and finally placed into service. Other regeneration cycles are also useful, however, the above 5-step cycle appears to yield more reproducible results.

The dealkalization unit 13 contains a bed of a strongly basic anion exchange resin, such as the aforementioned "Dowex" (a registered trademark) SAR, which is a strong basic type II anion exchange resin (a quaternary ammonium resin) in the chloride form. Strongly basic anion exchange resins function to dealkalize water, preferably softened water, by removing alkalinity type ions (as well as other ions) in accordance with the following general equation:

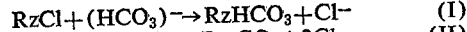
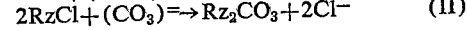

wherein Rz is a quaternary ammonium resin radical. For example, a softened water supply may have about 200 p.p.m. (parts per million) of alkalinity ions (bicarbonate and carbonate ions). Passing such water through a strongly basic type II anion exchange resin to the bicarbonate breakthrough point will remove all of the alkalinity ions. At this point, workers in the art of anion-exchange dealkalization consider the dealkalization capacity of the resin attained, since continued passage of water through the above strongly basis type II anion exchange resins would result in bicarbonate leakage into the effluent thereof. Nevertheless, bicarbonate ions have no significant adverse effect on reverse osmosis membrane life since such ions exist at pH values below about 8 to 8.2. The presence of carbonate ions is indicative of a pH value of above 8. Thus, in accordance with the principles of the invention, water is usefully pretreated for a reverse osmosis module by passing such water through a strongly basic anion exchange resin bed until carbonate ions are detected in the resin effluent. This greatly increases the resin capacity since carbonate ions will not leak through such a resin until all or substantially all of the bicarbonate ions have been passed through the resin bed. With the invention, the capacity of a strongly basic anion exchange resin to adjust the pH value of influent water of a reverse osmosis module is exceeded only when carbonate ions are detected in the resin effluent, i.e. when the resin effluent attains a pH value above 8 (carbonate ions cannot exist as a pH below 8).

To illustrate, but not limit, the advantages realized by the practice of the invention, the following demonstrations are set forth.

DEMONSTRATION A

A number of different water samples were prepared so as to contain various ion concentrations. The individual water samples were then passed through a strong basic type II anion exchange resin, in the chloride form ("Amberlite" IRA–410). The effluent from the resin bed was monitored for pH value and as soon as the effluent pH attained a value of about 8, the run was terminated and resin capacity calculated. The pertinent information is tabulated below:

TABLE I

|  | Influent characteristics | | | | | Total capacity at pH 8.2 | |
| --- | --- | --- | --- | --- | --- | --- | --- |
| Run | pH | Cl- | (HCO$_3$)- | (CO$_3$)= | (SO$_4$)= | Total bivalent anions | Gal. | Grains per cubic foot of resin |
| 1 | 9.65 | 5.05 | 4.74 | 5.14 | 4.87 | 10.01 | 935 | 18,720 |
| 2 | 9.55 | 4.80 | 4.46 | 5.14 | 4.51 | 9.65 | 1,125 | 21,720 |
| 3 | 9.55 | 5.67 | 4.30 | 5.63 | 4.87 | 10.50 | 1,030 | 21,620 |
| 4 | 9.55 | 5.10 | 4.19 | 5.34 | 4.60 | 9.94 | 1,070 | 21,260 |
| 5 | 9.90 | 5.35 | 4.77 | 4.86 | 5.05 | 9.91 | 940 | 18,620 |
| 6 | 9.89 | 6.65 | 4.71 | 4.90 | 4.90 | 9.80 | 995 | 19,500 |
| 7 | 9.93 | 5.58 | 5.08 | 4.61 | 5.10 | 9.71 | 925 | 17,960 |
| 8 | 9.56 | 5.10 | 4.72 | 1.98 | 1.80 | 3.78 | 2,100 | 15,880 |
| 9 | 9.56 | 5.20 | 5.00 | 2.00 | 1.92 | 3.92 | 2,165 | 16,580 |
| 10 | 10.15 | 5.30 | 4.90 | 9.80 | 9.80 | 19.60 | 560 | 21,960 |
| 11 | 10.15 | 5.25 | 5.00 | 10.10 | 9.80 | 19.90 | 520 | 20,700 |
| 12 | 9.84 | 5.45 | 5.00 | 5.00 | 14.00 | 19.00 | 490 | 18,640 |
| 13 | 9.88 | 5.35 | 4.95 | 5.00 | 8.80 | 13.80 | 735 | 20,440 |
| 14 | 10.16 | 5.05 | 4.88 | 10.24 | 0.00 | 10.24 | 1,040 | 21,280 |
| 15 | 9.47 | 5.00 | 5.00 | 2.30 | 20.00 | 22.30 | 465 | 20,760 |

It will be noted that the minimum capacity attained during the foregoing runs was 15,880 grains and the maximum capacity was 21,960 grains. Additionally, it appears that resin capacity increases as the influent concentration increases.

DEMONSTRATION B

In order to demonstrate the increased capacity of a strongly basic anion exchange resin for carbonate ions over bicarbonate ions, a water sample was prepared containing 85.5 p.p.m. of bicarbonate ions and 36 p.p.m. of carbonate ions herein. This water sample was passed through a typical strong basic type II anion exchange resin in the chloride form (i.e. "Amberlite" IRA–410) mentioned earlier, which was placed in a tank and the effluent thereof monitored for bicarbonate and carbonate leakage. A 10% leakage of the influent bicarbonate ions were detected in a resin effluent when 250 gallons of water had passed through the resin bed. Carbonate ions were not detected until 21,000 gallons had passed through this resin bed. The foregoing demonstration clearly illustrates that a strong basic anion exchange resin has a ratio of bicarbonate capacity to carbonate capacity of at least about 1:8.4. Accordingly, as a pretreatment agent for reverse osmosis module, a strongly basic anion exchange resin is at least about 9 times as effective for reverse osmosis dealkalization as it is in conventional processes, such as boiler or cooling tower dealkalization processes.

Reverse osmosis influent water is pretreated in accordance with the principles of the invention by passing such water through a strong basic type II anion exchange resin bed until the effluent (which is preferably softened prior to dealkalization) of the bed has a pH above 8. This point is well beyond the bicarbonate alkalinity breakthrough for a strong basic type II anion exchange resin as demonstrated earlier, and for example, in an extreme situation, the effluent from unit 13 may contain 100% of its original bicarbonate alkalinity and still be suitable for use in a reverse osmosis module, since it would have a pH value below about 8 and extend the life of cellulose acetate membranes within the reverse osmosis module. In contrast, a boiler water system effluent must have less than 1 to 10 p.p.m. of bicarbonate ions therein to avoid detrimental boiler operation. The carbon ion breakthrough in a strong basic type II anion exchange resin effluent marks the capacity of such a resin to maintain the pH value of influent water to a reverse osmosis module below 8.

As indicated earlier, regeneration of a spent or exhausted strong basic type II anion exchange resin is generally accomplished with a brine or salt solution. If desired, regeneration may also be accomplished with a mixture of brine and caustic.

In certain areas, fairly soft raw water is available (i.e. having a hardness of less than about 1 grain as calcium carbonate equivalents) and such water is usefully treated by a reverse osmosis system, provided that the reverse osmosis module influent has a proper pH. In such areas, a system such as illustrated at FIG. 3 is utilized. As shown, raw water enters the system via conduit 10 and passes directly to the dealkalization unit 13 for removal of at least carbonate ions therefrom. Conduit 14 guides the resin effluent into a modulating pH controller 21 to continuously monitor the resin effluent for variations in the pH value thereof. As soon as the effluent pH rises above about 8, an appropriate signal is generated by controller 21. The signal may automatically activate a valve means (not shown) in conduit 10 to shut off further water flow until after regeneration or may alert an operator to take appropriate steps to insure continued efficient and economical operation of the system. After controller 21, the dealkalized water passes via conduit 14a to a reverse osmosis module 15 as explained earlier.

This system may be modified to include a regeneration cycle, substantially as explained in conjunction with FIG. 2.

FIG. 4 is a schematic showing of the system illustrated at FIG. 1 and including representative ions present at various stages of a treating process constructed and operating in accordance with the principles of the invention. Thus, typical raw water may contain bicarbonate ions, (HCO$_3$)-, sulfate ions, (SO$_4$)=, carbonate ions (CO$_3$)=, magnesium ions, Mg$^{++}$, ferrous ions, Fe$^{++}$, and sodium ions, Na$^+$ and after passing through a softener unit 11, the effluent will contain (HCO$_3$)-, (SO$_4$)=, (CO$_3$)= and Na$^+$ ions and the hardness ions will be trapped within the strongly acidic cation exchange resin of unit 11. When this softened water passes through the dealkalization unit 13, initially all of the alkalinity ions (bicarbonate and carbonate), as well as other anions, such as the sulfate ions, will be removed by the strongly basic anion exchange resin in unit 13 and after a period of time the bicarbonate ions will be replaced by bivalent ions, such as carbonate ions, so that the influent water to the reverse osmosis module will contain chloride and bicarbonate ions, which do not adversely affect the cellulose acetate membrane life within reverse osmosis module 15.

Accordingly, it will be seen that the invention provides a method of pretreating reverse osmosis influent so as to increase the cellulose acetate membrane life without the use of acid. The pretreatment system disclosed is not adversely affected by reasonable fluctuations in the influent alkalinity content from hour to hour or day to day. A system utilizing direct acid feed necessarily has fluctuations in effluent water characteristics.

The invention not only effectively controls the reverse osmosis influent pH but also, in at least certain embodiments, removes hardness ions, such as calcium, magnesium, ion, etc. from the influent water, further increasing the reverse osmosis membrane life. Of course, systems utilizing direct acid feed do not remove hardness ions and thus give lower yields of reverse osmosis treated water and require higher maintenance of the reverse osmosis membrane due to the scaling tendencies of, for example, calcium sulfate, calcium carbonate, etc.

Removal of the metal cations from a reverse osmosis influent naturally reduces the total dissolved mineral content thereof and thus produces higher quality reverse osmosis treated water. Again, this advantage is not available from systems utilizing direct acid feed to control reverse osmosis influent pH.

In summation, the invention provides a reverse osmosis pretreatment system that maintains a reverse osmosis influent pH to a value below 8 and preferably in the range of about 7 to 8 by passing such influent through a strong basic type II anion exchange resin (in chloride form) until leakage of carbonate ions is detected in the effluent thereof. The principles of the invention are readily adapted to reverse osmosis operations to provide a combination of a dealkalization unit, with or without a prior softening unit, ahead of the reverse osmosis module.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, exception as is set forth and defined in the hereto-appandant claims.

I claim as my invention:

1. A process of pretreating reverse osmosis influent to maintain the pH value thereof below about 8 comprising passing a reverse osmosis influent through a strong basic type II anion exchange resin bed until carbonate ions are detected in the resin bed effluent and passing the pretreated resin bed effluent through a reverse osmosis membrane to obtain purified water.

2. A process as defined in claim 1 wherein said reverse osmosis influent is passed through said strong basic type II anion exchange resin bed until a pH value in the range of about 7 to 8 is attained in the effluent thereof.

3. A process as defined in claim 1 wherein said strong basic type II anion exchange resin bed is composed of a quaternary ammonium resin in the chloride form.

4. A reverse osmosis water treatment apparatus comprising the combination of a softener unit containing a strongly acidic cation exchange resin and having a water inlet and a water outlet; a dealkalization unit containing a strong basic type II anion exchange resin and having a water inlet and a water outlet; said dealkalization unit water inlet being in communication with said softener water unit outlet; and a reverse osmosis module containing a semi-permeable cellulose acetate membrane and having a water inlet, a purified water outlet and an impure water outlet; said reverse osmosis module water inlet being in communication with said dealkalization unit water outlet, said reverse osmosis module purified water outlet being in communication with a use and said reverse osmosis module impure water outlet being in communication with a drain.

5. A reverse osmosis water treatment apparatus comprising the combination of a dealkalization unit containing a strong basic type II anion exchange resin and having a water inlet and a water outlet; said dealkalization unit water inlet being in communication with a source of water having less than about 1 grain of hardness as calcium carbonate equivalents therein; a reverse osmosis module containing a semi-permeable cellulose acetate membrane and having a water inlet, a purified water outlet and an impure water outlet; said reverse osmosis module water inlet being in communication with said dealkalization unit water outlet, said reverse osmosis module purified water outlet being in communication with a use and said reverse osmosis module impure water outlet being in communication with a drain.

6. A process of purifying raw water containing alkalinity and hardness ions therein consisting essentially of (a) passing said raw water through a strongly acidic cation exchange resin bed until hardness ions are present in such resin bed effluent, (b) passing said resin bed effluent free of hardness ions through a strong basic type II anion exchange resin bed until carbonate ions are present in the resin bed effluent, (c) passing the resin bed effluent free of carbonate ions through a reverse osmosis membrane, (d) regenerating the resin beds with a salt solution, and (e) passing the reverse osmosis effluent to an end use.

References Cited

UNITED STATES PATENTS

| | | | |
|---|---|---|---|
| 3,639,231 | 2/1972 | Bresler | 210—259 X |
| 3,431,201 | 3/1969 | Johnson et al. | 210—23 |
| 3,684,094 | 8/1972 | Chamberlin | 210—321 X |
| 3,456,803 | 7/1969 | Rak | 210—321 X |

FRANK A. SPEAR, Jr., Primary Examiner

U.S. Cl. X.R.

210—259, 321